INVENTOR
EMIL UMBRICHT
BY
Curtis, Morris & Safford
ATTORNEYS

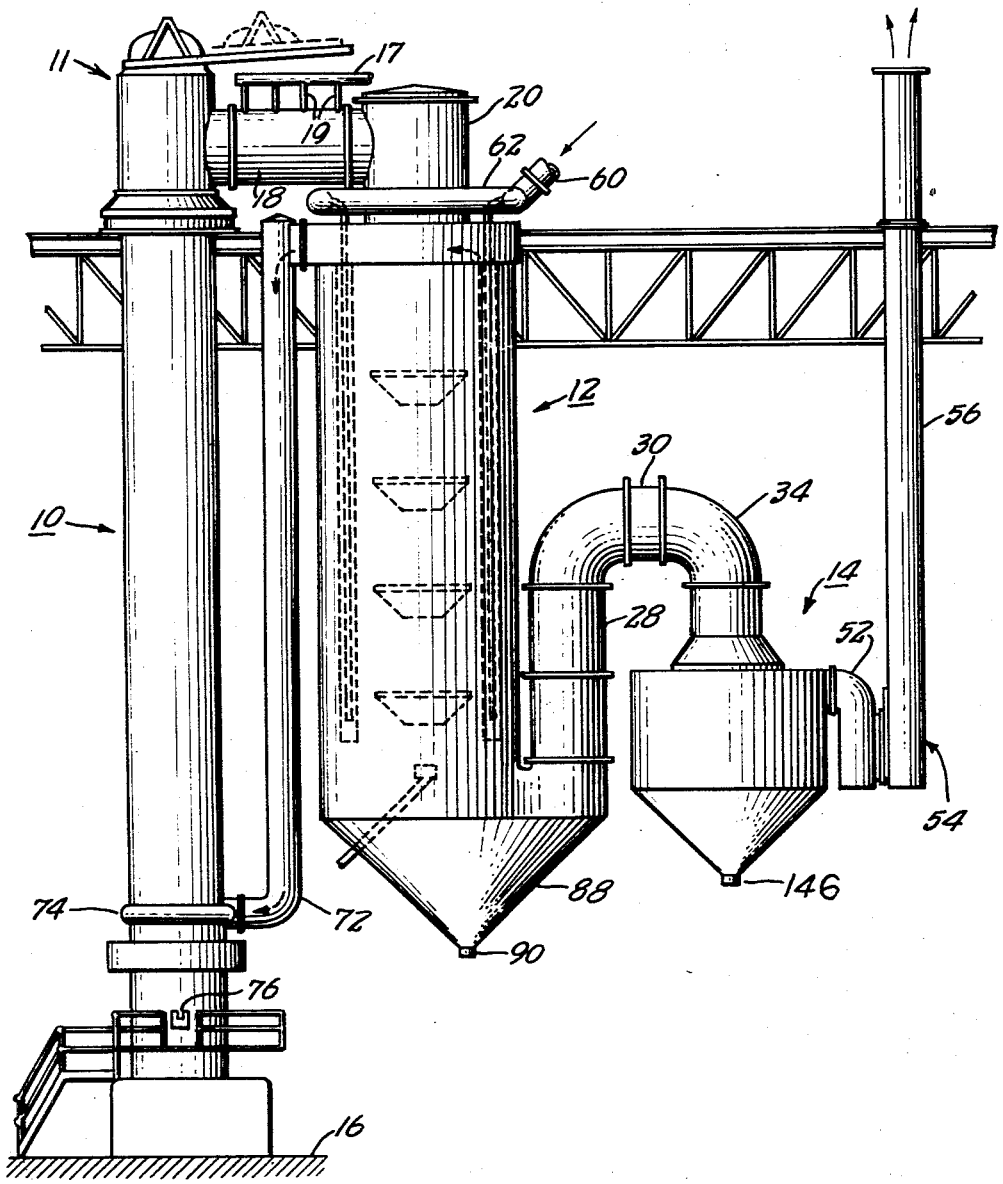
FIG. I.
INVENTOR
*EMIL UMBRICHT*
BY
Curtis, Morris & Safford
ATTORNEYS

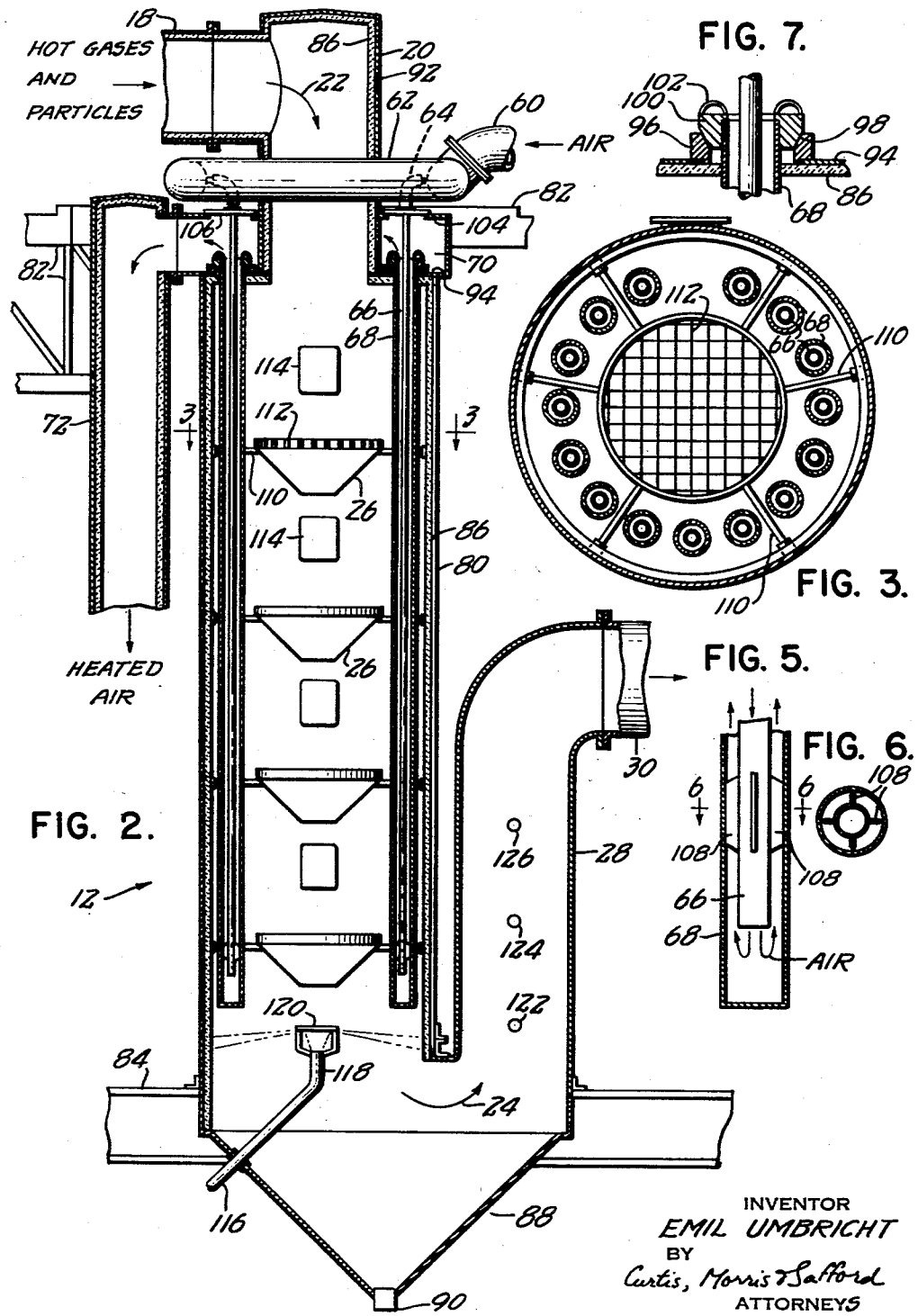

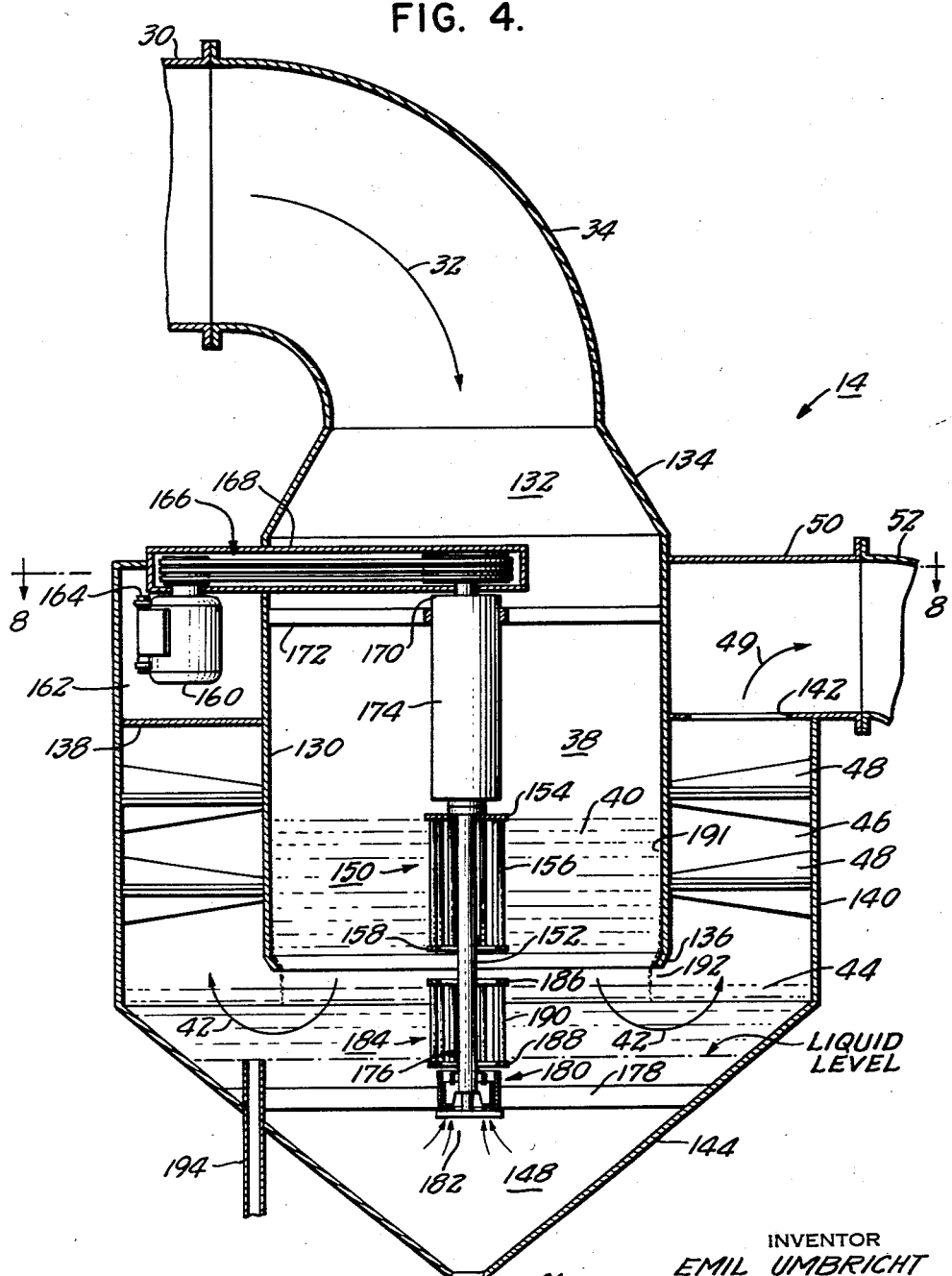

United States Patent Office 2,940,733
Patented June 14, 1960

2,940,733

HEAT EXCHANGE SYSTEMS FOR COOLING AND CLEANING CONTAMINATED HEATED GASES

Emil Umbricht, Jackson, Mich., assignor to Ajem Laboratories, Inc., Livonia, Mich., a corporation of Michigan Filed Oct. 8, 1956, Ser. No. 614,566

4 Claims. (Cl. 257—1)

The present invention relates to improved heat exchange systems for cooling and cleaning contaminated heated gases and for extracting the heat from the gases for further utilization. More particularly, this invention relates to improved heat exchange systems capable of handling large volumes of rapidly moving gases initially at high temperatures and containing in suspension substantial amounts of particles of various sizes. This improved heat exchange apparatus described as an illustrative embodiment of the invention is particularly well suited for use in industrial installations wherein the incoming velocity of these hot gases is high and the gases must be passed through the apparatus at a rapid rate while at the same time a high efficiency is obtained in the extraction of useful heat from the gases.

The illustrative embodiment of this invention described in detail in this specification is a heat exchanger extremely well suited for use in the most difficult and rugged installations. This apparatus is well suited for handling the large volumes of very high temperature gases containing large amounts of suspended solid particles which are discharged from various industrial furnaces, for example, such as metal treating furnaces. In the illustrative embodiment of this invention described herein the furnace from which the contaminated hot gases are being discharged is a cupola furnace of the type used in large iron and steel foundries. The improved washing apparatus described herein for cleaning the gases prior to discharge into the air is of the type wherein the gases to be washed are passed through a dense spray of washing liquid created by a centrifugal type spray generating cage positioned near the center of a gas-washing chamber.

The improved heat exchange system of the present invention is particularly well suited for use in industrial installations of the type which require the cleaning of vast quantities of extremely high temperature gases holding substantial amounts of solid particles, such as fly ash and oxide particles. In the apparatus described these gases are handled efficiently while being allowed to pass through at a high rate of speed, and nevertheless this apparatus advantageously obtains an efficient extraction of the heat from the gases just prior to the washing operation. The washing operation is carried on rapidly and obtains a substantially complete removal of all of the particles from the gases prior to their discharge into the atmosphere.

In various industries today, there are many different types of high temperature furnaces that discharge gases which must be cooled and cleaned before being discharged into the atmosphere. Good examples of these are the cupola furnaces, which discharge large volumes of gases at relatively high temperatures heavily loaded with solid particles of all sizes. These particles range in size from small clinkers to ultra-microscopic particles of fly ash, carbon and finely divided iron and iron oxide and other oxides. Along with these particles are often discharged considerable quantities of carbon monoxide which must be burned to prevent explosion during the cooling and washing. This burning of the carbon monoxide usually occurs at the top of the cupola furnace, but in many cases the flaming gas continues over into the short side ducts which carry the gases and solid particles directly to the heat exchanger. As a result, gases reaching the heat exchanger described herein are usually of a temperature near 1500° F.

In the operation of a cupola furnace such as described, it is most desirable for efficient operation that the fresh air being fed into the intake at the bottom of the furnace should be heated up to a relatively high temperature. The hot gases coming from the top of the furnace in being cooled down are used to preheat the fresh intake air before it is fed into the bottom of the furnace. The improved heat exchanger system described herein is rugged in construction and easy to maintain and is highly effective in producing the desired cooling of the exhaust gases and in warming up the fresh intake air.

There is also another reason why it is desirable to cool down the gases being discharged. In their heated state they are expanded up to two or three times their volume at atmospheric temperatures. This increased volume makes it very difficult to handle, process and clean the gases. By cooling them down as quickly and efficiently as possible, their volume is reduced sharply and they are rendered easier to wash.

A third reason it is desirable to extract as much heat as possible from the cupola gases is that their high temperature tends to deteriorate rapidly the equipment used in handling the gases. In certain instances parts of the prior types of equipment have been known to expand and buckle, to rust and burn through, because of the extremely high temperature present in the exhaust gases from the cupola furnace.

A number of different types of prior arrangements for cooling and cleaning gases discharged from cupola furnaces have been proposed and tried, but these prior arrangements have all suffered from a number of operational limitations and inefficiencies and have required extensive maintenance to keep them in operation. Among the limitations and difficulties experienced with the prior heat exchangers are their low heat exchange efficiency. Only a small portion of the available heat is extracted from the exhaust gases. Their temperature remains unduly high, causing excessive deterioration of the equipment. The high temperature causes a poor washing operation so that dense clouds of dirt are discharged from the exhaust stacks into the atmosphere around the foundries. And as a result of such inefficient heat exchange, the intake air to the cupola furnace is often found to be colder than desired, and a less efficient and wasteful heating operation takes place in the furnace itself. Also, the low temperature causes the heating of the metal to take place more slowly, leading to an increased amount of labor time and cost per ton being produced, and correspondingly reducing the tonnage output per furnace.

Another difficulty with prior heat exchange equipment is that rapid deterioration often takes place, and the equipment has a very short operating life. Considerable expansion and contraction occurs in operation and these changes in dimensions are not compensated for. In certain instances, the upper plates of the heat exchangers have become buckled and burned through under the impact of the flaming carbon monoxide gas being discharged. Then, dirt-laden hot exhaust gases are spewed from the top of the heat exchanger choking up the air around the furnace with dense clouds and increasing the hazard of fire or explosion.

In certain prior heat exchangers the heated gases are discharged through flue tubes. Such prior equipment suffers from warping and binding of the flue tubes, and the replacement of burned out tubes is then accomplished only by cutting them out with an oxyacetylene torch and welding new ones in place. This results in excessive maintenance costs and lengthy periods of "down time" for the furnace. Moreover, in such instances, it is necessary to allow the heat exchanger to cool down to such a low temperature that the men can enter and cut away the flue tubes being replaced. Thus, the amount of wasted time involved in their maintenance is very high.

Another problem usually encountered in the operation of the prior types of heat exchangers is that their heat-exchange surfaces become coated and corroded. Such coating decreases the coefficient of heat transfer at the surface and further reduces the efficiency of the exchanger. In such prior exchangers it is awkward for maintenance personnel to reach the heat exchange surfaces. As indicated above, because of warping and binding of tubes, partial dismantling of the heat exchanger must precede each routine cleaning of the heat exchange surfaces. This results in excessive maintenance costs and lengthy periods of "down time."

Also, the prior equipment in many instances serves to trap the particles so that they pile up and actually choke off a large part of the flow of the gases. At frequency intervals these prior heat exchangers must be allowed to cool so that men can enter and shovel out the collected piles of solid materials.

Among the many advantages of the heat exchanger apparatus described as an illustrative embodiment of the present invention are those resulting from the fact that it handles large volumes of heated gases from the cupola furnace over long periods of time without deterioration and without requiring any extensive or awkward maintenance procedures.

Another advantage of the heat exchanger described herein is that the intake air as it is being warmed up flows effectively counter-current to the hot exhaust gases. This provides a more efficient exchange of heat from the exhaust gases to the intake air. Moreover, the intake air is flowed through heat exchange tubes which are supported at only one point to accommodate any expansion or contraction. These tubes are hung from the top so that their lower free ends are enabled to move up and down freely with changes in temperature. This structure eliminates stresses due to dimensional changes and avoids any leakage in the equipment. Should it become necessary to remove one of these heat exchange tubes, a crane is readily swung over the top of the tube and it is then easily pulled up and out of the heat exchanger. A replacement can be dropped in place without any delay for a cooling period because the maintenance crew do not need to enter the heat exchanger at any time during replacement of any of the heat exchange tubes. The top suspension avoids any opportunity for binding.

Because of the efficiency of the heat exchange operation obtained with this improved heat exchanger and because it can be run continuously without any periods for cooling, the intake air is at a considerably higher temperature than is customarily obtained with prior equipment, and the overall operation of the cupola furnace is thus improved, cutting the length of time required to make each ton of steel.

Among the further advantages of the heat exchange apparatus described herein are those resulting from the fact that it is readily installed side-by-side with the cupola furnace and is adapted to receive the hot gases directly at the top. It enables a short rugged duct arrangement to be used leading from the top of the furnace directly into the top of the heat exchanger. The efficiency of the heat exchanger enables the handling of very large volumes of gases in a relatively small size unit. This improved heat exchanger includes baffle structures which provide suitable turbulence for the hot exhaust gases and act advantageously to collect and funnel substantial quantities of the larger solid particles borne by the hot gases. These particles are caught and dropped down through funnel shaped baffles near the center of the heat exchanger. Moreover, these baffles are grated over to serve as work platforms should it become necessary to enter the heat exchanger for repair.

Moreover, this heat exchanger includes spray cooling nozzles located below the heat exchanger tube compartment which adds to the efficiency of the cooling and washing process. These spray nozzles further cool the gases, reducing their volumes and begin to wet and agglomerate some of the microscopic particles before they reach the washer. This enables quicker and easier removal in the washer.

The improved gas washing apparatus described herein is particularly well suited for receiving the cooled gases from the heat exchanger. Among the advantages of this improved gas washing apparatus are those resulting from the fact that the incoming gas is enabled to be blown downwardly directly into the gas washing chamber in the center of the apparatus. Thus, the heavier particles are hurled down through the gas washing chamber and automatically become trapped in the washing liquid bath at the bottom. A very favorable uniform distribution of the intake gases occurs because they flow directly down into the unit without any requirement for abrupt reversal of direction near the entrance. Any tendency for the gas-borne particles to accumulate or coat over any of the surfaces near the entrance to the washer is substantially eliminated by the smooth rapid downward flow obtained.

A further advantage is that substantially all of the washing action occurs as the incoming gases are passing downwardly through the apparatus. Thus, the droplets of washing liquid are more readily removed, for the gases, after being washed, are abruptly reversed in direction, passing upwardly through a large annular moisture elimination compartment. A sudden deceleration in the gases occurs as they pass upwardly in this chamber and into the baffles, and substantially all of the moisture is advantageously removed from the gas.

Also, the moisture eliminator or baffle compartment has an annular form of a much larger cross sectional area than that in the washing chamber resulting in a relatively slower flow of the washed gases therethrough. The overall operation of the washer provides increased efficiency and a reduced amount of maintenance is necessary.

The various aspects, features, objects and advantages of the present invention will be more fully understood from a consideration of the following description in conjunction with the accompanying drawings, in which:

Figure 1 is an elevational view showing at the left a cupola furnace; an improved heat exchanger embodying the present invention is shown near the center of the drawing; and at the right is illustrated an improved gas washing apparatus discharging into a vertical stack at the extreme right;

Figure 2 is an elevational axial sectional view, on enlarged scale, of the improved heat exchanger shown in Figure 1 embodying the present invention;

Figure 3 is a cross-sectional view taken along the line 3—3 of Figure 2 looking downwardly and shown on enlarged scale;

Figure 4 is an elevational axial sectional view of the improved air washing apparatus embodying the present invention;

Figure 5 is a partial elevational axial sectional view of the lower end of one of the heat-exchange tubes, shown on enlarged scale;

Figure 6 is a cross sectional view through this tube taken along the line 6—6 of Figure 5 looking downwardly;

Figure 7 is a partial elevational cross sectional view showing an enlarged scale the seating and supporting of the heat exchanger tubes at their upper ends;

Figure 8:
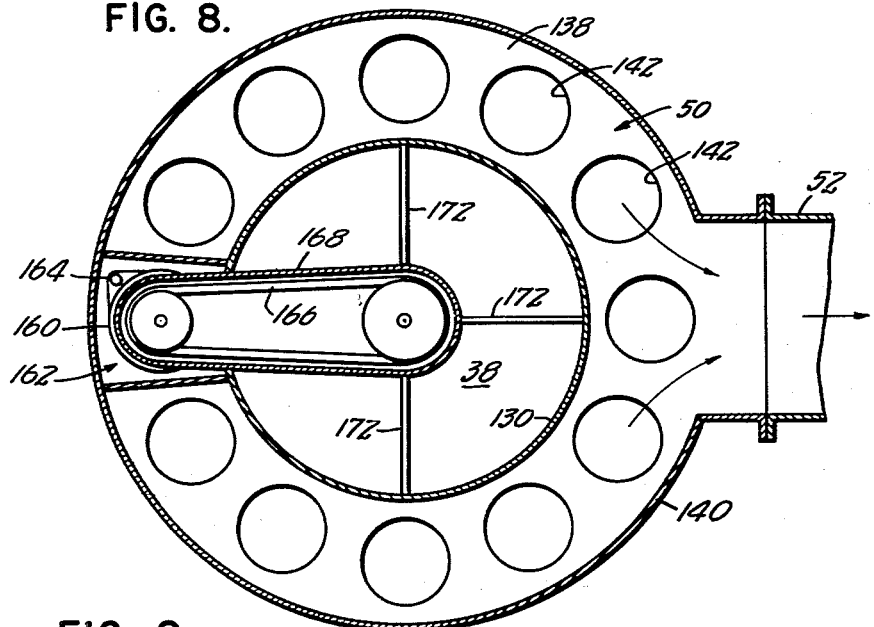
Figure 8 is a cross sectional view of the improved air washing apparatus taken along the line 8—8 shown in Figure 4 looking downwardly.

*General description of the improved heat exchange system for cooling and cleaning gas and its operation*

Referring to Figure 1 in greater detail, it is to be understood that the relative sizes, proportions, and arrangement of the cupola furnace, generally indicated at 10, the improved heat exchanger, generally indicated at 12, and the improved gas washing apparatus, generally indicated at 14, is exemplary of and in general correspondence with those of a modern installation embodying the present invention. However, in order to make the operation more clear and to emphasize the features of the present invention, much of the accessory equipment surrounding the cupola furnace has been omitted for purposes of clarity. For example, such equipment as coke and limestone hoppers, travelling cranes, railroad tracks and various chutes and pipes and trussess for the operation of the equipment are not included in this drawing. This drawing illustrates an installation in which the top of the cupola furnace at 11 is more than 90 feet above the floor level as shown at the lower left at 16.

In operation, the cupola furnace 10 is charged and as the metal is being melted the gaseous by-products usually including burning carbon monoxide, and vast quantities of solid particles ranging from ultra-microscopic size up to the size of small clinkers rise up from the body of the furnace into the top and are discharged through a short convenient and rugged horizontal intake duct 18 directly into the top 20 of the heat exchanger 12. In certain installations an initial reduction in temperature is obtained in the duct 18 by supplying cooling water through a manifold 17 and feeding the water to a number of pipes 19 connected to a series of spray nozzles directed into the interior of the duct 18. It is to be noted how conveniently this heat exchanger 12 is positioned adjacent to the cupola furnace and that it enables the utilization of a relatively short straight duct to feed the hot gases and particles into the top of the heat exchanger.

These hot gases pass down through the body of the heat exchanger as indicated in Figure 2 by the arrows 22 and 24. In flowing down through the heat exchanger the gases pass a plurality of conical baffles 26 which, advantageously, act as collectors for the fly ash and larger particles. When these gases reach the bottom of the heat exchanger, they make an abrupt turn, shown at 24 and pass up through an exchanger discharge duct 28. These cool gases pass over through a short coupling duct 30 directly into a sweepingly curved washer intake manifold 34 leading directly down into a circular central gas washing chamber 38 of the gas washing apparatus 14.

After passing through the dense spray 40 of washing liquid in the chamber 38, the washer gases sweep down as shown at 42 through an additional high velocity spray 44 of denser and larger droplets for scavenging the smaller droplets. The washed gases then pass up through an annular moisture eliminator plenum chamber 46 including suitable moisture eliminating baffles 48. As shown by the arrow 49, the dried gases flow into an annular outlet manifold 50 surrounding the washing chamber 38 above the annular chamber 46. From the outlet manifold 50 the gases pass over through an outlet duct 52 into a large capacity centrifugal type pump, generally indicated at 54, and are discharged up the stack 56 into the atmosphere with substantially all of the particles of whatever size removed therefrom.

In order to feed the cupola furnace 10 with suitably preheated air, large quantities of fresh air are drawn in from the atmosphere by a blower (not shown) and driven through a fresh air intake pipe 60 leading to an annular fresh air intake manifold 62 which surrounds the top 20 of the heat exchanger just below the hot gas duct 18. From the annular manifold 62 the fresh air is substantially uniformly distributed through flexible elbow couplings 64 into a plurality of cool air inlet pipes 66 extending down vertically within the heat exchanger tubes 68.

As shown in Figure 5, this fresh air returns upwardly through the heat exchanger tubes 68. The fresh air flows up through the annular space outside the inlet pipes 66 and within the heat exchanger tubes 68.

Thus, the fresh air is efficiently heated and is then collected in an annular hot air manifold 70 surrounding the heat exchanger near the top and just below the intake manifold 62. Then the preheated air passes over and down through a vertical supply stack 72 which leads down to a preheated air supply manifold 74 surrounding the body of the cupola furnace below the combustion zone. From this manifold 74 the preheated air is injected into the cupola furnace.

The high temperature of this preheated air enables a more efficient and rapid heating of the metal in the cupola furnace 10. Molten metal is withdrawn from the furnace as needed through the pouring spout 76.

*Detailed description of the apparatus and its operation*

The construction of the improved heat exchanger apparatus is shown in detail in Figures 2, 3, 5, 6, and 7, and attention is directed more particularly to these figures in the first part of the following description. The heat exchanger includes a cylindrical steel shell 80 supported at the top from a suitable truss 82 and braced at the bottom by a large beam 84. A high temperature refractory type heat insulation layer 86 is secured to the inner surface of the shell 80. At the bottom, the heat exchanger is connected into the enlarged mouth of a discharge collection cone 88 converging downwardly whose lower end empties into a flush-out and dirt collection and drainage pipe 90 having a diameter of about 8 inches.

The top 20 of the heat exchanger comprises a cylindrical shell 92 lined with a heat insulation layer 86. The diameter of this top shell 92 is about one-half the diameter of the main shell 80 and it is joined to the main shell by an annular supporting ledge 94 from which the heat exchanger tubes 68 are suspended. Seat rings 96 are secured around a number of openings in the ledge 94 and provide annular seating surfaces 98 at an angle of about 60° with respect to the horizontal. These seating surfaces mate with corresponding surfaces on collars 100 welded around the upper ends of the heat exchanger tubes. Thus, the heat exchanger tubes hang vertically in the heat exchanger and readily accommodate all dimensional changes. Hoisting eyes 102 project up from the upper surfaces of these collars for ease in lifting out and replacing the tubes.

A second annular supporting ledge 104 surrounds the upper shell 92 and forms the top of the hot air manifold 70. This ledge 104 has a number of openings directly over corresponding ones in the ledge 94. These upper openings in the ledge 104 are larger than the lower ones so as to admit the collars 100. These upper openings have removable cover plates 106 through which are hung the inlet pipes 66.

It is an advantage of this apparatus that the lower ends of the inlet pipes are spaced a substantial distance above the closed lower ends of the heat exchanger tubes 68. The inlet pipes are held centrally positioned within the tubes 68 by four radial guide vanes 108 secured to the pipes 66 and sliding freely against the inside surface of the tubes. Thus, this structure advantageously enables any relative expansion or contraction to take place between inlet pipe, heat exchanger tube and the frame of the heat exchanger itself.

Counter-current effective flow is obtained between the fresh cool air flowing up along the inner surfaces of the heat exchanger tubes and the hot gases flowing downwardly along their outer surfaces. Thus, a more efficient heat transfer occurs. As the temperature of the fresh air is raised it continues to flow up and thus it continues to encounter hotter and hotter surfaces of each heat-exchanger tube.

This apparatus enables an easy procedure to be used in order to remove a heat exchanger tube. The corresponding elbow coupling 64 is loosened, and the inlet pipe and its supporting cover plate 106 are withdrawn. Then suitable hoisting equipment is hooked onto the eyes 102 and the heat exchanger tube drawn out. No warping and binding of the exchanger tubes occurs and they are easily withdrawn and replaced in a brief time.

To collect the larger particles and clinkers, four downwardly converging funnel-shaped baffles 26 are supported along the axis of the heat exchanger by means of braces 110 cantilevered in from the shell 80. The upper wide mouths of these baffles are covered by gratings 112 which are positioned below access doors 114 and can be used as work platforms. These baffles and gratings cause turbulence in the rapidly moving hot gases and thus provide effective intimate contact between the exhaust gases and the surfaces of all of the tubes.

Particles collected by the respective baffles 26 are momentarily arrested and then they drop down from baffle to baffle through their axially aligned central openings and into the collection cone 88 where they are readily flushed out.

In order to cool further these exhaust gases after leaving the heat exchange zone, a water injection pipe 116 runs up just above the side opening 24 which leads into the exchanger discharge duct 28. This pipe feeds a straight nozzle 118 aimed up at a flat circular deflector plate 120 creating a dense annular spray as indicated. An initial agglomeration of the smaller particles is begun by the wetting action of the spray from this nozzle and plate. This water spray usually contains suitable wetting agents. The pipe 116 is fed under high pressure from a rugged non-clogging centrifugal pump such as is disclosed in my copending application Serial No. 357,450, filed May 26, 1953, now Patent No. 2,890,660 granted June 16, 1959.

While they are flowing up the discharge duct 28 the exhaust gases are further cooled and moistened by a number of high pressure sprays from nozzles 122, 124, and 126 fed from the same pump as the pipe 116. The excess liquid flushes down the collection cone 88 and returns through the pipe 90 to a suitable settling tank, not shown, in which the pump is immersed.

The improved air washer shown in Figure 4 is very effective in cleaning many different types of contaminating particles from gases. For example, this apparatus is used to advantage in numerous industrial applications in removing from the air such various types of both liquid and solid particles as occur in smoke, scarfing dust, the compounds and dust from buffing operations, ferrous and non-ferrous metal grindings, particles from shot peening work, paint droplets and particles from paint spray operations, and this apparatus is very effective in removing various chemical fumes from the air, such as those over electro-plating baths.

A very high efficiency and effectiveness is obtained with this gas washing apparatus coupled to the heat exchange apparatus described above. This improved gas washing apparatus includes an inner cylindrical wall 130 open at the top and connected to the mouth of a diverging intake chamber 132 defined by a truncated conical wall 134 connected at its upper end to the gradually curved intake manifold 34. The lower end of the inner cylindrical wall 130 has a short converging lip 136 and opens down near the dense scavenging spray 44. Surrounding the inner cylindrical wall 130 and spaced therefrom by a horizontal annular partition 138 is an outer cylindrical wall 140 pierced by a number of outlet ports 142 interconnecting the annular plenum chamber 46 with the outlet manifold 50.

At the lower end of the outer wall 140 is a sludge collection cone 144 which forms the bottom of the gas washer and is connected down into a 6 inch diameter flush out drain pipe 146. In this collection cone 144 is a reservoir 148 of gas washing liquid with a level as shown spaced a substantial distance below the lower lip 136. The spacing of the liquid level below the lip 136 is generally commensurate with the spacing between the inner and outer walls 130 and 140, respectively.

The washing liquid which may be used and which I find to be highly effective in its cleaning of the gases is an aqueous solution containing wetting agents, foam inhibiting agents and corrosion inhibitors. In certain applications water is used to advantage without the use of some or all of these additives, depending upon the conditions of the exhaust gases and the contaminating agents present.

This gas washer provides many advantages. Among these advantages are those resulting from the fact that the incoming contaminated gases blow directly down and into the gas washing chamber without encountering any abrupt changes in flow pattern. In the diverging intake chamber 132 the walls recede from the contaminated gases and face downwardly at an angle affording little opportunity for the solid particles to build up any deposits on the wall 134. In this intake chamber the gases are slowed down somewhat by the increase in cross sectional area and then flow directly into the gas washing chamber 38 at a desirably fast rate. Thus, a substantially uniform distribution in the flow pattern of the gases through the gas washing chamber 38 is obtained. The gas velocity at all points is substantially equal providing good conditions for efficient gas washing.

The larger clinker-size particles are hurled straight down through the washing spray 40 onto the surface of the reservoir 148 where they are trapped and removed from the gases being washed. Medium size and smaller particles are struck with the uniform, very high speed and dense spray 40 radiating outwardly horizontally from a rapidly rotating spray-generating cage 150. This cage is concentric with the wall 130 of the gas washing chamber and is secured to a vertical drive shaft 152. The cage includes a top disk 154 secured to the shaft with uniformly spaced vertical rods 156 extending down from its perimeter and are held rigidly spaced from each other at their lower ends by a ring 158 seen in section. Washing liquid is projected rapidly up into this cage through the opening in the ring 158, as explained below. This liquid strikes the underside of the rapidly rotating disk 154 and is struck by the rapidly revolving rods 156 and is flung out to form the high-speed spray 40. This spray has droplets of substantially uniform size moving outwardly at very high speed and thoroughly scrubs and cleans the gases. The spray 40 sweeps out the contaminating particles and carries them over onto the inner surface of the wall 130. The liquid from the spray 40 cascades down the inner surface of the wall 130 and flushes down all of the agglomerated particles as indicated at 191. This dirty washing liquid cascades down past the lip 136 which advantageously deflects it inwardly so as to form a curtain 192 which advantageously resists the gas flow 42. And then the curtain 192 penetrates and is caught by the scavenging spray 44. A highly efficient cleaning action occurs in chamber 38 by virtue of the uniform gas flow distribution and the dense uniform spray and the other advantageous factors discussed above.

In order to turn the shaft 152, a powerful electric motor, for example, such as a three-phase induction motor 160 having a rating in the range, for example, from one hundred to several hundred H.P. is used. This motor is shown as being mounted in a box-like compartment 162 formed at the height of the outlet manifold opposite the outlet duct 52. In certain installations it is desirable to mount the motor 160 on a suitable support outside of the outer wall 140 and to utilize the space 162 for added gas flow capacity. This motor is shown mounted by means of a vertical pivot 164 so that its position can be adjusted to tension properly the multiple V-belt drive 166 which runs over through a narrow housing 168 to driven pulleys secured to the upper end of the shaft 152.

At its upper end the shaft 152 is supported in a bearing 170 held by several radial braces 172 extending out to the inner wall 130. A cylindrical casing 174 surrounds the bearing 170 and extends down to a position closely above the top of the cage 150.

At its lower end the shaft 152 is supported in a second bearing 176 which is located within the bore in the lower end of the drive shaft 152 and above the liquid level in the reservoir and held by braces 178 extending out to the cone 144, as described in detail hereinafter.

In order to throw the liquid up into the upper cage 150 a submerged pump 180 sucks the liquid up through its annular intake 182 and propels large quantities of this liquid vertically up along the shaft 152 and in through the ring 158.

A second spray-generating cage 184 is secured to the shaft 152 just above the top or discharge end of the pump 180. This second cage includes top and bottom rings 186 and 188 each held to the shaft by a plurality of spokes, thus leaving numerous large openings up through which the liquid is propelled into the upper cage. A number of uniformly spaced vertical rods 190 extend vertically between these latter rings. The lower ring 188 and a small portion of the bottom end of each rod 190, for example, such as the lowest two inches of the rods, are below the liquid level. Large quantities of liquid are also fed up into the cage 184 by the pump 180 so as to be struck by the rods 190 and broken up into a dense scavenging spray 44 of somewhat larger droplets than in the spray 40. In addition to the liquid propelled up by the pump, the submerged ring 188 and lower portions of the rods 190 create vast quantities of a dense spray also of larger droplets which merge into and augment the scavenging spray 44 coming from the upper portions of the rods 190.

The larger droplets in this scavenging spray advantageously entrap any fine liquid droplets which otherwise might tend to blow out of the apparatus along with the gas stream 42. By virtue of the curtain of liquid 192 intersecting and penetrating the scavenging spray 44, the gas flow 42 is forced at all points into intimate contact with the scavenging spray, both as the gas initially flows downwardly inside of the curtain 192 and then as it flows up outside of this curtain 192 through the spray 44 into the moisture eliminator plenum chamber 46, as indicated by the arrow 42. The liquid from the spray 44 and curtain 192 runs down the inner wall of the cone 144.

In many cases it is desirable to maintain a continued flush out action in the reservoir 148 by means of an upwardly directed nozzle in the center of the drain pipe 146 as shown in detail and claimed in my copending application Serial No. 399,438 filed December 21, 1953. The desired liquid level in the reservoir is maintained by a suitable overflow pipe 194 leading down into a settling tank (not shown) to which the pipe 146 is also connected.

This gas washing apparatus is adapted to handle large quantities of gases rapidly and efficiently, for example, the volume of gas may range from 75,000 to 90,000 cubic feet per minute.

The cages 150 and 184 are approximately 18 inches in diameter and are each approximately 2 feet long, the upper cage being shown approximately 30% longer than the lower cage. The drive shaft 152 is turned at approximately 800 r.p.m.

Figure 9:
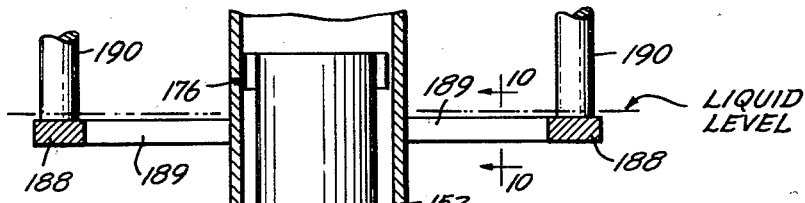
Figure 9 is a cross sectional view, on enlarged scale, showing the liquid elevating pump at the lower end of the drive shaft.
Figure 10:
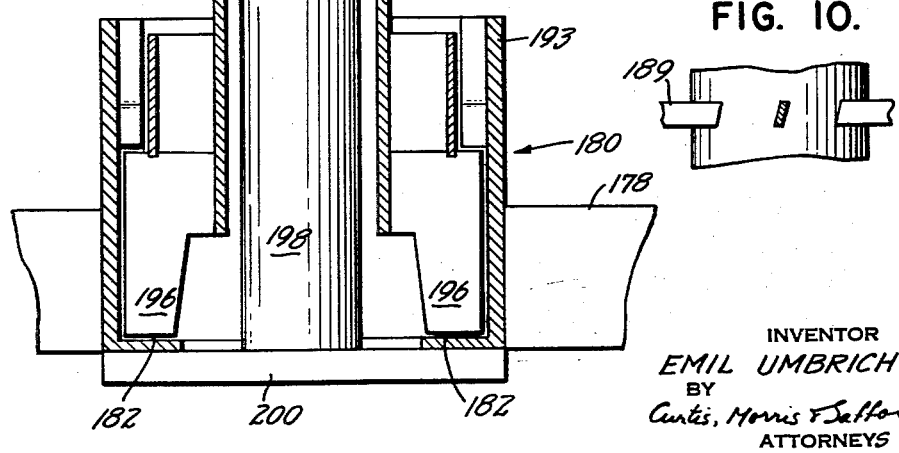
Figure 10 is a partial sectional view along the line 10—10 in Figure 9.

As illustrated in Figures 9 and 10 the ring 188 for the lower cage is supported by spokes 189 which are inclined at an angle to the horizontal in the range from 20° to 85° depending upon the cage diameter, speed of the shaft 152, and the vertical velocity of the liquid ejected up by the pump 180. With the cage diameter and 800 r.p.m. described above, the angle of 75° is advantageous.

The ring 186 at the upper end of the lower cage is supported by inclined vane spokes similar to the spokes 189 for the lower ring. In certain installations, for example, where a higher shaft speed is used, similar inclined vane spokes also are used for the ring 158.

These sets of inclined vane spokes form propellers which accelerate the liquid up into the lower cage and up through the lower cage into the upper cage.

The pump 180 includes a cylindrical casing 193 and a hub structure 194. Impeller vanes 196 project out from the hub and have their outer edges closely adjacent to the inner surface of the casing 193. These vanes impel the liquid up into the spray-generating cages at a rapid rate in a large volume. A pump such as that described in U.S. Patent No. 2,599,202 may be used. The liquid is distributed along the rods 190 and 156, producing uniform and dense spray patterns in the regions 40 and 44. The various sets of inclined vane spokes, such as the inclined vane spokes 189 give a further boosting action to these large volumes of upwardly travelling liquid.

The lower bearing 176 is supported on a fixed central shaft 198 projecting up into the gun-bored lower end of the drive shaft 152 to a height above the liquid level. A plurality of radial braces 200 extending across the intake support the shaft 198.

As the gas moves up through the plenum chamber 46 its velocity is slower because of the increased cross sectional area, reducing any tendency to carry out fine droplets of the liquid. In passing through the sets of moisture eliminator baffles, further traces of the droplets are removed.

In a particular gas washing machine as shown in Figure 4 the gas washing chamber 38 has a diameter of 9 feet, yielding a cross sectional area of about 64 square feet. The outer wall 140 has a diameter of 15.5 feet, thus giving a net cross sectional area for the plenum chamber 46 of about 125 square feet, or just about twice that of the gas washing chamber. Thus, the upward velocity in the moisture eliminating chamber is only about one-half that of the down draft in the gas washing chamber.

In the improved heat exchanger described herein a pipe is illustrated projecting into a tube in spaced relationship therewith defining an annular space therebetween. As used herein the term "pipe" and "tube" are intended to include passage defining means having any manner of cross sectional form, for example, such as rectangular, triangular, oval, and the like. And the term "annular" is intended to include any form of space, shape or seat, for example, such as the annular space encircling the inner passage defining means or "pipe" and within the outer passage defining means or "tube." In most applications the circular cross section is advantageous for the pipe and tube, in view of the strength. However, in certain instances where it is desired to increase the outside surface area of the tubes with respect to their cross sectional areas, more irregular cross sectional shapes, such as those mentioned above, are of advantage.

From the foregoing it will be understood that the embodiment of the present invention described above is well suited to provide the many advantages set forth, and since different embodiments may be made of this invention and as the apparatus herein described may be varied in various parts, all without departing from the scope of the invention, it is to be understood that all matter hereinbefore set forth or shown in the accompanying drawings is to be interpreted as illustrative and not in a limiting sense and that in certain instances, some of the features of the invention may be used without a corresponding use of other features, or without departing from the scope of the invention.

What is claimed is:

1. An improved heat exchanger including walls defining an upright heat exchange chamber adapted for the passage of a gas downwardly therethrough, heat exchange tubes having flanges thereon, first mounting means suspending said tubes substantially vertically within said chamber in an annular configuration from a point near their upper ends, the lower ends of said tubes being closed, supply pipes having outer dimensions less than the inner dimensions of said tubes, second mounting means suspending said pipes from points near their upper ends with the lower ends of said pipes extending down into said tubes, the interior of said pipes communicating at points near their lower ends with the annular spaces within said tubes and around said pipes, and a plurality of downwardly funnel-shaped baffles within said heat exchange chamber, said funnel-shaped baffles being spaced vertically along the axis of said heat exchanger and within the annular configuration of said heat exchange tubes, said baffles having central openings at the bottom thereof each positioned on the axis of said heat exchanger and vertically aligned one above another, said baffles being adapted to trap particles in said gas and to discharge the particles down through said central openings, said baffles also being adapted to cause turbulence in the gas as it engages said heat exchange tubes, liquid spray-generating means within said chamber beneath said members, the lower portion of said chamber including a drain pipe for said liquid spray and particles trapped therein.

2. An improved heat exchanger as claimed in claim 1 wherein said spray generating means includes an upwardly directed nozzle and a substantially horizontal baffle plate spaced thereabove.

3. A heat exchanger comprising means defining an upright cylindrical chamber having a fluid inlet near the top and a fluid outlet near the bottom and adapted to convey a heated fluid down through said chamber, first mounting means extending over the top of said chamber having a plurality of annular seats with openings down therethrough, each of said annular seats having downwardly converging conical surfaces surrounding the opening, said annular seats being arranged in a circular pattern near the inner wall surface of said cylindrical chamber, a plurality of vertical heat exchange tubes, each of said tubes having a flange thereon near its upper end with a conical surface on the flange converging downwardly, each of said tubes projecting down through one of said openings into said chamber with the conical surface on the flange bearing against and being supported by the conical surface of the annular seat, the lower end of each tube being closed, said tubes being in a circular pattern closely adjacent to the inner wall surface of said chamber second mounting means above said first mounting means and having a plurality of annular seats with openings therethrough which are larger than the diameter of the flanges on said tubes, a plurality of vertical pipes, each of said pipes projecting down through the openings of the second mounting means and having a flange on its upper end engaging the annular seats of the second mounting means for supporting the pipes with the lower end of each pipe near the closed lower end of the tube into which it projects, fluid conveying means connected to said pipes for conveying fluid down into said pipes, the fluid rising up through the annular space between the outer surface of the pipe and the inner surface of the respective tube, said first and second mounting means defining a chamber for receiving the fluid rising from said tubes, and a plurality of downwardly converging funnel-shaped baffles spaced vertically one above another along the axis of said chamber within the circular pattern of said heat exchange tubes, said baffles being adapted to trap particles within the fluid and having axial openings for discharging the trapped particles downwardly, said baffles causing the heated fluid to impinge with turbulence upon said tubes.

4. An improved heat exchanger for handling hot gases containing particles such as fly ash comprising an upright chamber having a cylindrical wall and a downwardly converging bottom with an outlet drain at the low point of the bottom, said chamber having an inlet for the heated gases near the top and an outlet near the bottom, a plurality of heat exchange tubes having closed lower ends, first support means for said tubes suspending said tubes vertically in a circular pattern within said chamber near its cylindrical wall, a plurality of supply pipes having outer dimensions less than the inner dimensions of said tubes, second support means positioned above said first support means, said second support means suspending said pipes from points near their upper ends with the lower ends of said pipes extending down into said tubes almost to the lower ends thereof, a plurality of access doors in said wall at vertically spaced positions, a plurality of downwardly converging conical baffles positioned vertically one above another along the axis of said chamber within the circle of said tubes for trapping the particles in the gas, said baffles having central openings discharging downwardly along the axis of said chamber, a grating member extending over the top of each of said baffles, structural means supporting said baffles at levels within said chamber with said grating members adjacent to each of said access doors, whereby said grating members provide footing support means for workmen within said chamber, said baffles and grating members causing the hot gas to impinge upon said tubes with turbulence, thereby increasing the heat exchange.

References Cited in the file of this patent

UNITED STATES PATENTS

| | | |
|---|---|---|
| 1,419,337 | Werner | June 13, 1922 |
| 1,952,269 | Lundquist | Mar. 27, 1934 |
| 1,962,322 | Murray et al. | June 12, 1934 |
| 2,332,450 | Mantle | Oct. 19, 1943 |
| 2,397,230 | Armathes | Mar. 26, 1946 |
| 2,409,780 | Mekler | Oct. 22, 1946 |
| 2,467,346 | Trubenbach | Apr. 12, 1949 |
| 2,527,015 | Lhota | Oct. 24, 1950 |
| 2,699,375 | Johannsen et al. | Jan. 11, 1955 |
| 2,729,301 | Ekstrom | Jan. 3, 1956 |

FOREIGN PATENTS

| | | |
|---|---|---|
| 375,132 | Great Britain | June 23, 1932 |
| 732,474 | Great Britain | June 22, 1955 |
| 244,267 | Germany | Mar. 3, 1910 |
| 67,745 | Norway | July 28, 1942 |
| 763,540 | France | Feb. 12, 1934 |